United States Patent [19]

Ford

[11] Patent Number: 5,141,611
[45] Date of Patent: Aug. 25, 1992

[54] REMOVING AND RECOVERING PLANT POLYPHENOLS

[75] Inventor: Douglas L. Ford, Eastwood, Australia

[73] Assignee: Memtec Limited, Parramatta, Australia

[21] Appl. No.: 415,399

[22] Filed: Sep. 27, 1989

Related U.S. Application Data

[63] Continuation of Ser. No. 10,976, filed as PCT/AU86/00137, May 15, 1986, abandoned.

[30] Foreign Application Priority Data

May 16, 1985 [HU] Hungary .................. PH0587

[51] Int. Cl.⁵ .................. A23L 2/30; C12H 1/04; B01D 61/58; B01D 61/44
[52] U.S. Cl. .................. 204/182.4; 426/330.3; 426/330.4; 426/330.5; 426/423; 210/690; 210/691; 210/692
[58] Field of Search .......... 204/182.4, 182.3, 182.5, 204/182.6, 301; 426/330.3, 330.4, 330.5, 423; 210/690, 691, 692

[56] References Cited

U.S. PATENT DOCUMENTS

| | | | |
|---|---|---|---|
| 2,988,782 | 6/1960 | Parrish et al. | 264/17 X |
| 3,222,180 | 12/1965 | Sucietto | 426/422 |
| 3,463,763 | 3/1969 | Griffiths | 528/488 |
| 3,551,351 | 12/1970 | Murray et al. | 426/422 |
| 3,711,293 | 1/1973 | Geiger | 71/120 |
| 3,878,310 | 4/1975 | Field et al. | 426/422 |
| 4,008,339 | 2/1977 | Matsuda | 426/330.4 |
| 4,144,373 | 3/1979 | Weiss et al. | 252/62.54 |

FOREIGN PATENT DOCUMENTS

| | | | |
|---|---|---|---|
| 10973/83 | 8/1983 | Australia . | |
| 10974/83 | 8/1983 | Australia . | |
| 639366 | 4/1962 | Canada | 426/422 |
| 923364 | 3/1973 | Canada | 426/422 |
| 53-008789 | 3/1978 | Japan | 426/422 |
| 61-254166 | 11/1986 | Japan | 426/422 |
| 942686 | 11/1963 | United Kingdom | 426/422 |
| 1052445 | 12/1966 | United Kingdom . | |
| 1436466 | 5/1976 | United Kingdom . | |
| 84/03054 | 8/1984 | World Int. Prop. O. . | |
| 84/04529 | 11/1984 | World Int. Prop. O. . | |

Primary Examiner—John F. Niebling
Assistant Examiner—John S. Starsiak, Jr.
Attorney, Agent, or Firm—Oblon, Spivak, Spivak, McClelland, Maier & Neustadt

[57] ABSTRACT

Polyphenolic substances such as food dyes, tannins, fruit juices and wine colorings are removed from a solution by adsorption onto a regeneratable adsorbent polyamide of extended surface and controlled porosity. The surface chemistry of the polyamide may be modified by a glutaraldehyde/resorcinol treatment. The polyphenolic substances are recovered by elution with water or other protonic solvent.

24 Claims, No Drawings

REMOVING AND RECOVERING PLANT POLYPHENOLS

This application is a continuation of application Ser. No. 07/010,976, filed as PCT/AU86/00137, May 15, 1986, now abandoned.

FIELD OF INVENTION

This invention relates to the removal and/or recovery of plant polyphenols.

BACKGROUND ART

The water soluble polyphenols of plants are industrially significant since they occur in fruit juices as well as in extracts, infusions and fermentations of plant products. There is a wide distribution of such polyphenols in the root, stem, leaves, bark and flowers of many plant families.

There are many chemical classes of polyphenols and these include:

(a) Anthocyanins (substituted flavanols) which give the red, blue and purple colour to many flowers, fruit skins and juices as well as foliage. The betacyanin of beetroot is related to the anthocyanins. The anthocyanins are used as food dyes.

(b) Polyhydroxyflavones which are yellow plant dyes.

(c) Isoflavones which are related to the flavones but are less abundant.

(d) Derris insecticides and fish-stunning rotenones which are related to the isoflavones.

(e) Logwood dyes which are related to the flavanols.

(f) Cannabis compounds which are polyphenol derivatives.

(g) Many mold pigments which are polyphenolic xanthones.

(h) Vitamin E which is a monophenolic chromane derivative and is related to the polyphenols.

(i) Thyroxine which is a phenolic acid of importance to animal metabolism, technically it is a derivative of a polyphenol.

(j) Many polyphenolic acids which occur in fruits and barks, particularly in coffee beans and in plant galls. They are regarded is simple analogues of one class of tannins, the ester tannins.

(k) The ester tannins embrace the sugar esters with polyphenolic acids and are used in inks.

(l) The condensed or catechin tannins are related to the anthocyanins and are used for leather tanning.

(m) The bitter principles of hops, humulones, are related to polyphenols.

(n) The humic acids of soils and waters are oxidised polyphenols and form carcinogenic halocarbons on chlorination during chloride disinfecting, affecting public health.

(o) The estrogenic flavanoids of clovers affect sheep breeding.

Polyphenols are present in many commercially important products such as molasses, tea, cocoa, coffee, wine, beer, all fruit juices, herbs and many medicinal infusions.

The anthocyanins are important in wine and fruit juice colours. Their combination with metal salts may discolour these products.

There are many occasions in which fruit juice and wine colours undergo reduction of colour or other modifications by traditional processes such as filtering or settling or adsorbing on non-toxic solids.

The tannins and polyphenolic acids greatly affect the taste, astringency and keeping qualities of wines, beers, fruit juices and especially coffee and tea. The tannins and polyphenolic are also involved in the formation of some hazes and precipitates in beverages.

Traditional methods of removing any of the polyphenolic bodies from one another or even as a class are limited. The higher molecular weight tannins are easiest to remove by precipitation with high molecular proteins such as gelatin, but it is difficult to add the exact amount of gelatin even in favourable cases.

In order to maintain a reasonably constant end product, it is often the case that products from different species and locations are blended together. Although this is a practical solution to product consistency, it is an expensive one.

Food processing has reached the point where there is a need for new procedures for modifying the polyphenol content of a wide variety of products.

For example, the demand for white wines may exceed supply when red wines are in excess. Red wine grapes may be used in part for making white wines. This may be done by excluding the skins but pink tinges often occur and must be removed.

Cheap fruit juice such as apple juice, is often added to aerated waters in place of refined sugars or to other juices to maintain "a wholly natural juice" ingredient claim. The apple browning reaction is rapid in air. Therefore prior to such addition the apple juice must be bleached.

Apple juice is normally bleached with active carbon, but attempts to bleach dark juices can result in reduction of flavour.

Active carbons are used to adsorb brown colours in cane sugar processing and in starch hydrolysates but these brown stains differ from the polyphenol oxidation products in apple juice. A different adsorber from carbon is needed but none has been developed which suits the practical requirements of large scale processing.

In short, market demands have outstripped the traditional food colouring and flavouring practices. The present invention is based upon selective polyphenolic substance removal and recovery which adds a new technique to natural product technology ranging from fine wines to laminated wood.

In conjunction with suitable active carbons, many colours are more completely and more economicaly separated by the processes of the invention to give a colourless liquid with full odour retention and most taste retention although many bitter and astringent tastes can be removed if desired, by removing the causative tannin.

The prior art in polyphenol determination and removal is usually specialised to a particular product such as wine, sugar cane, beer and apple juice. Much of the prior art is ancient in origin and much depends on art and experience, which is often local in application.

However, the main colouring agents of these products are now known and their presence is usually measured at known absorption wavelengths.

Thus the browning of apple juice which is largely a phenolic oxidation, catalysed by a diphenoloxidase, is measured at 420 nanometers by the optical density (O.D.) of a 1 cm cell thickness at 20 degrees Celsius. See D. A. Heatherbell, J. L. Short and P. Strubi, Confructa, Vol. 22 (1977), No. 5/6, p. 158.

The total phenol content is measured by a modified Folin-Ciocalteu procedure following V.L. Singleton and J. A. Rossi Jnr., American Journal of Enology and Viticulture, Vol. 16(1965), p. 144–158.

Recently chromatographic procedures have been developed to analyse these polyphenolic mixtures in somewhat greater detail. However quantitative analysis of fully identified constituents is not possible, because of the presence of polymeric series of homologues and the enormous variations of composition according to conditions of treatment.

Polyphenolic class separations as may be achieved in trace amounts analytically cannot yet be applied on the scale required in food industries.

The analytical adsorption agents used to date have been extremely varied and include a large number of fine powders such as alumina, silica, various clays, bentonites, ion-exchange resins and many types of carbon.

One particular analytical adsorption agent is a polyamide 6,6 powder, which is rather specific for the tannins but not other polyphenols.

Only analytical traces of tannins are adsorbed on chopped filaments of polyamide 6,6 in chromatographic procedures. There is no large scale technology to use such fine powders as a means of removing tannins from a base material.

Cheap tannin separation would allow tannin from wood wastes to be used in phenolic/formaldehyde wood binding resins. Crude size separation alone by ultrafilters has had some success for glue intermediates but has been inadequate for colour removal and chemical methods are uneconomic.

In summary there has been no versatile large scale process for removing polyphenols from plant extracts, preferably with some separation of chemical classes to allow recovery of valuable polyphenolic components.

Various adsorbents have been proposed but all suffer from difficulties.

(i) Polyamides such as nylon and perlon have a large molecular weight distribution. As they are formed as a large solid mass during manufacture it is not possible to remove the low molecular weight fraction before use. When finely chopped and used as an adsorbent, the low molecular weight fraction is somewhat soluble in the liquid being treated. This contravenes food regulations in some countries. However, their greatest deficiency is that they have a very low adsorption efficiency.

(ii) Polyvinylpyrrolidone (PVPP) has high production costs and must be regenerated for reuse. The regeneration involves the use of strong acids and alkalis which may not be completely washed off and which may therefore contravene food regulations. There is a loss of activity when PVPP is regenerated several times. In addition, PVPP swells in water and tends to block the filters. As it can only be made as a fine powder PVPP cannot be used in a column as a multistage process but must be mixed with the liquid being treated and then filtered out as a single stage process. It is not capable of adsorbing high molecular weight polyphenols such as tannins as only the smaller low molecular weight plant phenols can fit inside the fine resin pores.

(iii) Condensation products of polymers of polyamino and/or polyhydroxy compounds and formaldehyde as described in Great Britian Patent 1,531,852 are not specific adsorbents for plant polyphenols. They adsorb acids which are lost from the fruit juice or other drink, casting doubt on the legality of continuing to call the liquid a pure food when some components are missing. Their method of preparation by powdering a large mass results in low surface area and hence low adsorptive efficiency. They cannot be tailored for pore size.

(iv) Polyetherurethanes, as described in European Patent Application 0080298, are nonspecific. They are basically a gummy solvent, removing flavour as well as colour. They have low efficiency.

DISCLOSURE OF INVENTION

Polyphenols are adsorbed from solution by polyamide resin of controlled porosity and extended surface made by precipitation from an acidic, partly hydrolysed colloidal solution of a polyamide. Suitable polyamides are aliphatic polyamides of high crystallinity and preferably they are based on orientated polyamide 6 or polyamide 6,6.

The preferred polyamide resin, polyamide 6 is made from the polymerization of caprolactam. Polyamide 6 is available as scrap yarn and filament which are suitable raw materials for the process of this invention. Polyamide 6,6 is useful but is not as adsorptive for polyphenols.

The polyphenols are recovered selectively and the resin regenerated by extraction with alkali or acid or polar solvents or mixtures thereof. The polyamide resin may be modified chemically after formation and may be coprecipitated with inert powders.

The adsorptive membranes of the invention can adsorb much more polyphenol than the prior art. Indeed up to 91% of tannic acid and 3.9% of anthocyanin like material can be adsorbed onto polyamide 6 as will be apparent from Example 18 below. Prior art materials adsorb less than 10% of tannic acid, most often only 2 to 5%.

The polyamides are dissolved in an acidic solvent according to Australian patent specification No. 505,494 of Unisearch Limited. Larger pore sizes are best made from acidic solvents according to International Patent Application PCT/AU84/00081 which corresponds to U.S. Pat. No. 4,623,463. The distinctions between the process of Australian Patent Specification No. 505,494 and U.S. Pat. No. 4,623,463 are discussed in the latter patent. In both cases, a partly hydrolysed "dope" results from the action of the strongly acidic solutions of acids on the polyamide.

The dope is then introduced as a thin section of sheet or droplet or rod into a precipitating bath. The shape of the polyamide is varied in accordance with the nature of the adsorbing apparatus. Flat sheets cast on glass and then precipitated can be used for short contact times but the associated flat sheet cartridges are expensive and not as conducive to fractional elution as fine particles packed in a column. The main use of flat sheets is to cover rotary vacuum filters.

Fine beads can be used in packed columns, as can finely chopped threads. Injection of the dope under water as multiple threads which are wound up continuously is convenient. The threads are easy to wash countercurrently and can be used in bundles or may be chopped and crimped to lock together. They then resist washing displacement better than beads and do not need fine, easily blocked screens to retain them.

The parallel threads can be bound into a large bundle which fits cylindrical columns for adsorption and regeneration. For very large scale use, there are advantages in a truly continuous system in which the polyamide moves down a column countercurrently to the polyphenolic feed liquid. The countercurrent flow and regeneration are assisted by modifying the resin particles in various ways.

Commonly the resin particles are made dense by incorporating dense, unreactive solids such as barium sulphate. Another technique is to make the particles magnetic by incorporating a coated, protected magnetic or magnetisable pigment such as magnetite or fine permanent magnet powders. All these techniques are applicable to this invention by making such additions to the dope before casting into shapes.

The continuous sheet form of the polyamide membrane can be formed into segmented rotary vacuum filters. This allows countercurrent contact with the feed and the regenerated solutions and any needed washing with solutions.

Furthermore,.an equilibrium state of continuous separation can be set up along the length of the filter belts so that relatively pure fractions of recovered polyphenols can be recovered continuously at various places around the rotary porous belt.

A novel form of polyamide porous membrane is formed if the dope is cast onto a plate or drum at 100 to 300 micron thickness and then immersed in an alkali hydrogen carbonate solution. A sheet detaches with numerous coarse holes of 0.05 to 1 mm diameter. The holes usually have fragments of thinner membrane partly covering them. The main bulk contains ultrafiltering sizes of interconnected pores.

When allowed to age, the sheets can be cut into small pieces by a rapidly rotating blender blade. These small pieces have a large surface but only a small pressure drop. They are well suited to column operation. The shape is similar to animal stomach lining and is quite easily compressed to give an elastic, porous, space-filled material.

Co-precipitation with inert powders such as diatomite was found to result in a greatly improved uptake of polyphenols.

Improvements of the order of 100% were achieved with tannins, and of the order of 50% with bromothymol blue.

A production process was found to produce extremely uniform convenient powders containing approximately 50% of polyamide 6, now prepared in a manner giving adsorptive capacities far in excess of the known art.

These powders were also successful in full scale column packing as multistage adsorbents, particularly for apple juice Because of their uniformity they give very little frontal liquid mixing between the respective liquid layers during processing.

Modification of the surface chemistry of the membrane by reaction with glutaraldehyde and then resorcinol according to International Patent Application PCT/AU84/00015 allowed separation of polyphenol fractions in a procedure capable of being scaled up to be suitable for commercial use.

Reaction of the membrane with glutaraldehyde, followed by use of melamine or 1,6 - hexamethylenediame, or mixed amino acids resulted in surface modification of the membrane that enabled separation of a selected range of low molecular weight tannins from wood, salts and sugars. The tannins could be recovered and used as a raw material for reaction with formaldehyde as wood glues. Since the purified tannins have no water solubles they give glues that do not rot or soften. The process is capable of being scaled up for commercial use.

The invention is specific to the removal of those polyphenols which comprise or closely mimic in shape the natural polyphenols. The pore size of the polyamide can be adjusted to select polyphenols of a particular size range. The pore size can be adjusted by the choice of conditions of hydrolysis and of precipitation and of initial crystallinity in the polyamide, which then forms specific complexes with the plant polyphenols.

Polyphenols are of relatively low molecular weight (except for some condensed tannin fractions) and, since their adsorption depends on the interaction of phenolic hydroxyl groups with correctly-spaced amide groups, a very fine pore suffices e.g. pores cutting off at 1,000 to 50,000 daltons.

An important feature of the invention is that there is no removal of flavour nor any recognised food component except polyphenols.

Another advantage of the fine pores is that proteins and high molecular tannins need not be removed unless desired. They are removed by silica, clays, diatomaceous earth and carbon. The invention allows precise control of pore size, surface area and surface chemistry of the polyamide. Indeed the invention adsorbents complement the action of carbons in bleaching.

It is preferred that the polyphenols be first separated by the porous polyamide 6 of the invention. These, polyphenols saturate active carbons nullifying the specific active carbon removal of the so-called "HMF" derived colours. "HMF" means hydroxymethyl-furfural, a degradation product of sugars which forms brown colours particularly by polymerising or by reacting with amine groups, usually amino acids. These sugar-derived colours are common in food technology and have stimulated the use of active carbons for bleaching.

These active carbons e.g. SHIRASAGI Z-IIW 30 of Takeda Chemical Industries are then able to be used in traces to remove the "HMF"-derived colours. The correct sequential use of the two adsorbent agents gives the greatest colour removal, the easiest separation during regenerative elution and the longest useful life of both bleaching agents.

One advantage of the invention is that the adsorbent can be tailored to allow rather specific uptake of polyphenolic fractions from food and other sources where additives or pH changes are forbidden.

The tailoring depends on microstructure, pore size and almost any desired surface chemistry except powerful oxidant groups. Unwanted surface material or insolubles may then be washed away with water.

The recovery by elution of the anthocyanin and the derived anthocyanidin plant colourants can be very varied because of the sensitivity of the chemical structures to pH, to the presence of differing cations and anions and to solvent composition and temperature. Thus cyanin is the same pigment of the red rose and of the blue cornflower in different environments (mainly of pH). Even the presence of tannins and proteins and pectins alters the colours. On the other hand peonidin glycosides from the morning-glory are not pH sensitive due to the particular spatial conformation (shape) favoured by the molecules.

Recovery of polyphenols from the polyamide by elution then has some guiding principles, for example tannins are best removed by alkaline eluants. Elution by non volatile alkalis poses problems of separation from the alkali ion which can be solved by electrochemical splitting into a tannin solution and a regenerated alkali stream for reuse. The electrochemical splitting may be conducted in a cell doubly divided by electrodialysis membranes impermeable to the tannic acid or to tannic ions. Stable electrodialysis membranes are of the type used in chloralkali cells.

A volatile alkali such as ammonium hydroxide is effective, easily removed and recovered. In the presence of sulphite some replacement of phenolic group by amino-groups is possible (Bucherer reaction) especially at high temperatures.

Anthocyanins are best removed at pH 1 to pH 4 by dilute acetic or hydrochloric acid.

Quite often the addition of polar organic solvents such as alcohol is beneficial. High temperatures can hydrolyse the anthocyanins to the anthocyanidins usually with slight colour changes. The simultaneous production of sugars during the hydrolysis is generally undesirable. Aqueous ethanol brought to pH of 1 to 4 with hydrochloric acid is generally useful but pH adjustment to pH 4 with acetic acid is more gentle and allows evaporation of eluted fractions with residue or decomposition.

The following are examples of the formation and use of the polyamide absorbers in conformity with the invention.

EXAMPLE 1

A mildly oxidised apple juice had a 420 nm, 1 cm cell optical density (O.D.) of 0.565. With the porous polyamide 6 alone it gave an O.D. 0.034; with the carbon alone 0.082; with first porous polyamide 6 and then only 10% of the same carbon it fell to 0.002.

The carbon was thus allowed to act efficiently by first removing the interfering polyphenols.

EXAMPLE 2

A solvent (A) was prepared by mixing 225 ml of 6.67 normal hydrochloric acid with 15 ml of anhydrous ethanol. 90 grams of 55 dtex 17 filament polyamide 6 (Nylon 6) with zero twist was added to solvent A (which was at a temperature of 22 degrees Celsius) over a period of less than 15 minutes.

The mixture ("dope") of the polyamide 6 and solvent A was then left to mature for 24 hours at a temperature of 22 degrees Celsius during which the relatively non-crystalline portions of the polyamide dissolved as did no more than 50% of the relatively crystalline portion, with the remaining relatively crystalline portion dispersed in the solvent.

The matured colloidal dispersion and solvent was then spread as a film of about 120 microns thick on a clean glass plate using a flat knife.

The coated plate was placed in a water bath of 18 degrees Celsius where precipitation of the dissolved portions of the polyamide 6 was effected within three minutes. Electron microscopic study of the resultant membrane showed that the colloidal relatively crystalline portions were joined together by the precipitated relatively non-crystalline portions. The pore size increased from the top face to the layer on the glass plate. Water permeability was about 200 litres/square metre/-hour under a pressure of 150 Kilo Pascals.

The membrane adsorbed 15% of its dry weight of B.P. tannic acid from a 5% w/v aqueous solution in 1 minute. This relatively huge adsorption of tannic acid compared with 0.1% to 1% adsorbed by carbons and 0.2 to 2% by fine nylon 6 yarns.

The tannic acid was recovered by eluting with 15N ammonium hydroxide and recovering the latter for recycle by distillation, preferably under reduced pressure. This method of recovery is useful for acidic polyphenols and is especially valuable for recovering tannins. Since they are bases pure anthocyanins and betacyanin from fruit skins and beet wastes and dark juices for use as safe food colourants are best removed by dilute acidic solvents.

EXAMPLE 3

The nylon 6 membrane of EXAMPLE 2 was reacted with glutaraldehyde and then resorcinol according to International Patent Application PCT/AU84/00015.

The product was washed with dilute sodium hyroxide followed by exhaustive water washing. The membrane rejected 40% of ovalbumin of Mol. Wt. 43,000.

A cartridge of 32 parallel plates was formed from the flat sheets. The area was one square meter, the dry weight of membrane was 60 grams and the swollen volume was 225 ml.

A commercial oxidised apple juice with an initial 420 nm O. D. of 0.670 in a 1 cm cell at 22 degrees Celsius was pumped through at 15l/hour at 22 degrees Celsius. The first liter had an O. D. of 0.059, the second 0.060.

These colours could not be reduced with general purpose active carbons but could be reduced with the specific SHIRASAGI IIW 30 carbon. The third liter showed a slight rise of optical density to 0.084. The fourth liter showed a definite rise of optical density to 0.109.

These results were obtained by filtering through a membrane averaging 120 micron thickness. It is apparent that adsorption is so rapid that countercurrent operation will result in polyphenol chromatography rather than greater decolourisation. If decolourising alone is required single stage operation is possible.

To examine fractional elution during regeneration a slug of 20 ml of 5N sodium hyroxide was injected and effluent fractions were collected.

These were characterised by colour, colour with ferric salts at pH 8.5 and on colour on acidification with hydrochloric acid.

| No. | Volume | Colour | Acid Colour | Ferric Colour |
|---|---|---|---|---|
| 1 | 0-100 ml | Nil | Nil | Nil |
| 2 | 100-200 ml | Slight Brown | Lemon Yellow | Purple |
| 3 | 200-1200 ml | Dark Brown | Deep Yellow | Intense Purple |
| 4 | 1200-1500 ml | Pale Brown | Pale Amber | Blue-green |
| 5 | 1500-2000 ml | Pale Amber | Light Tan | Faint Grey |

It is to be noted that the Folin-Ciocalteu total phenol colour intensities paralleled the ferric intensities but gave a constant blue hue, varying only in intensity. Furthermore, none of the fractions resembled tannic acid which gave an entirely different purple ferric colour test.

Chemical fractionation occured during the elution of the 120 micron layer. The ability to separate polyphenols on a practical scale is demonstrated since further scale-up consists of similar units in parallel.

EXAMPLE 4

The regenerated polyamide from EXAMPLE 3 was washed until the effluent had pH 7.98. This was then used to treat the combined decolourised product of EXAMPLE 2 which had a 420 nm optical density of 0.078. At 15 l/hour the first liter had an optical density of 0.034, the second liter had an optical density of 0.056.

These results were better than EXAMPLE 2 showing that the regenerated adsorbent is superior in ultimate colour reduction to the initial adsorbent porous membrane.

EXAMPLE 5

An oxidised apple juice with a 420 nm, 1 cm cell optical density of 0.670 was treated overnight in air with excess I.C.I. Americas general purpose carbon, Code 42.I.J. The optical density was 0.570, which was very poor. The material was then treated with an excess of the membrane used in EXAMPLE 3 and the colour fell to an optical density of 0.337. This experiment showed that the polyamide membrane removed colouring matter that could not be removed at all with this carbon from highly discoloured apple juice.

EXAMPLE 6

Twelve discs, each 47 mm dia. were cut out and stacked in an Amicon cell. Their weight was 1.102 g and swollen volume 3.996 cu.cm but post experimental examination showed that only the center 42 mm had been usefully employed due to isolation by the compressed rubber seals.

Apple juice, which has an optical density of 0.607 at 420 nm was passed through the stack of membranes at 200 kPa. Fractions were collected and the volumes and O. D. measured. The following results were obtained:

| CHROMATOGRAPHIC ADSORPTION OF APPLE JUICE COLOUR | | |
|---|---|---|
| Fraction Vol. ml. | Total Vol. ml. | O.D. |
| 5 | 5 | — |
| 5 | 10 | — |
| 60 | 70 | 0.03 |
| 75 | 145 | 0.040 |
| 30 | 175 | 0.055 |
| 25 | 200 | 0.060 |
| 80 | 280 | 0.068 |
| 110 | 390 | 0.077 |
| 90 | 480 | 0.184 |
| 25 | 505 | 0.211 |
| 15 | 520 | 0.122 |
| 33 | 553 | 0.142 |
| 40 | 593 | 0.166 |

This experiment showed typical chromatographic behaviour with adsorption and elution.

EXAMPLE 7

To determine the distribution coefficient of 420 nm colour (Kd) between the membrane filtered juice and the activated carbon SHIRASAGI Z-11W 30,.100 ml samples of membrane filtered juice were separately shaken with 1.0 g and 0.1 g of the carbon for one hour at 80 degrees Celsius. The optical density fell from 0.062 to 0.004 and 0.036 respectively.

The distribution coefficients were:

$Kd$ (1%) = 1450 and $Kd$ (0.1%) = 720

The activated carbon removed the "HMF" sugar colours in the absence of the polyphenolics and sequential use of the membrane then the carbon gave the best result (compared with Example 5).

EXAMPLE 8

Kd on the raw juice was determined using both the membrane of EXAMPLE 2 and the spongy form of EXAMPLE 1. The following results were obtained (the initial optical density was 0.67).

| Material | Amount | Kd |
|---|---|---|
| Example 1 | 1% | 104 |
| Example 1 | 0.1% | 737 |
| Example 2 | 1% | 371 |
| Example 2 | 0.1% | 281 |

The results were not directly comparable with those of EXAMPLE 7 since the concentration of polyphenols was approximately ten times greater and the colourants were now mostly polyphenols rather than the constant low level of "HMF" colour.

EXAMPLE 9

The spongy form of Nylon 6 in Example 1 was modified with glutaraldehyde followed by:
(a) melamine,
(b) 1,6-hexamethylenediamine,
(c) mixed amino acids Samples of both the unmodified and each of the three modifications were equilibrated with half their weight of tannic acid in 200 mls of solution. Uptake of tannic acid was measured by the reduction in optical density of the solution. This "difference method" was justified by the large (40%-50%) changes in optical density observed at 282 nm. after appropriate dilution.

| Modification | Equilibration | Uptake % W/W |
|---|---|---|
| None | 1 | 20 |
| (a) | 1 | 25 |
| (a) | 2 | 23 |
| (b) | 1 | 20 |
| (c) | 1 | 20 |

Between the two equilibrations of sample (a), it was washed with dilute KOH solution which was then acidified. The liberated tannic acid was cloudy, and had to be filtered before its optical density could be measured. This may account for the fact that only 85% recovery was observed. It should be noted that in all cases, including the KOH wash, the kinetics were rather slow at ambient temperature. The reaction appeared to have a half time of about 1 hour. Diffusion from outside the adsorbent to the inside was much slower than forced filtration through an adsorbent membrane, as expected.

The adsorption of pharmaceutical grade tannic acid was large—20 to 25% of the membrane weight. This is industrially significant because salts, sugars and even higher molecular weight tannins (above 40,000 daltons in this case) can be rejected.

The purified tannic acid can be recovered by washing with ammonium hydroxide and evaporating off the ammonia and water, best under vacuum, for recycle.

Thus crude Pinus radiata and similar tannins can be purified as a raw material for reaction with formaldehyde as wood glues. These purified glues have no water solubles and do not rot nor soften. In addition, the viscosity of the glue can be lowered by exclusion of the high molecular weight tannins.

EXAMPLE 10

Lindermans "Cellar Pack" burgundy with an ethanol content of 11% volume was passed through 60 g of one square meter membrane of EXAMPLE 3 at 0.4 liters/min. The initial optical density was 3.61 in a 1 cm cell at 20 degrees Celsius at the extinction maximum of 512 nm. The effluent showed the following optical density:

| VOLUME | OPTICAL DENSITY (1 cm, 512 nm.) | COLOUR REMOVAL |
|---|---|---|
| 0-1000 ml | 0.106 | (97.1% adsorption, pale pink) |
| 1000-1600 ml | 0.172 | 95.2% |
| 1600-2600 ml | 0.542 | 85% |

Hence useful single-stage adsorption was limited to less than two liters/60 g. adsorbent before regeneration was needed. The adsorption of 95 to 97% is comparable with the 85 to 98% retained by 1000 molecular weight cut-off ultrafilters but the latter's production rates are many times lower than that of this invention. Also ultrafilters do not adsorb but merely concentrate about twofold and do not separate salts and sugars. The purification mechanism is entirely different. The adsorbed material was displacement washed with water (1 liter showing an optical density of 0.232).

Elution with one liter of methylated spirit (ethanol) containing 1 ml of 10N hydrochloric acid gave an optical density of 6.68, then one liter of water gave an optical density of 1.413. A further one liter of water gave O.D.=0.16.

The colour balance showed 99.1% recovery which was good considering changes of extinction coefficient at different pH and solvent. A single stage batch equilibration of the same wine and the adsorbent of EXAMPLE 2 showed a distribution coefficient of 105.

The ethanolic elution fraction was evaporated. The major anthocyanin of grapes is a malvidin 3,5-diglycoside (malvin) but the product isolated as deep red crystals was malvidin chloride (1.382 g) equivalent to 530 parts per million in the original wine.

The chloride was sparingly soluble in water but very soluble in ethanol to a crimson and purple solution. The chloride could be washed with a small amount of 10N HCl, then recovered by evaporation in a purified form. The molar extinction coefficient in ethanol in a 1 cm cell at 512 nanometers was 2.4 million.

The adsorbent very effectively removed the burgundy wine colour and allowed the colour to be recovered as a stable food colourant (up to 100 times the normal concentration of commerce).

EXAMPLE 11

"Mountain Maid" Apple Cider Vinegar had an optical density of 0.836 at 420 nanometers. The vinegar was passed through the apparatus of EXAMPLE 3 at 500 ml/minute and the optical density of successive fractions were taken as follows:

| SAMPLE | VOLUME | OPTICAL DENSITY 420 nm, 1 cm cell, 20° C. |
|---|---|---|
| 1 | 0-750 ml | 0.046 |
| 2 | 750-1500 ml | 0.083 |
| 3 | 1500-2250 ml | 0.107 |
| 4 | 2250-3000 ml | 0.134 |
| 5 | 3000-3500 ml | 0.150 |

All the output was suitable for premium light coloured apple cider. Only colourant removal could be detected. A single stage adsorption showed a distribution coefficient of 31.

The adsorbed colour did not wash off with water which was passed through until the pH rose to 6. Then the adsorbed colour was eluted with 10 ml of 2N sodium hydroxide in 1 liter of water as a brown-black solution. At pH 3 this solution became distinctly more amber and showed a 420 nm optical density of 2.75.

Adsorption of apple oxidation colour occurred just as easily from the vinegar as from apple juices. Premium grade coloured apple cider vinegar can be made from the cheaper dark grade.

EXAMPLE 12

An Orlando "Coolabah" Burgundy had a 1 cm 512 nanometer optical density of 2.505.

Two liters were repeatedly passed through the 60 gram, one square meter membrane of EXAMPLE 3 and the optical density measured at each pass.

The membrane was regenerated between each pass by washing with water, N/10 sodium hydroxide, N/10 acetic acid, then water.

| Pass No. | Optical Density | Colour |
|---|---|---|
| 1 | 0.548 | Deep Red |
| 2 | 0.203 | Deep Red |
| 3 | 0.078 | Deep Red |
| 4 | 0.038 | Deep Red |
| 5 | 0.020 | Faint Pink in 10 cm depth |
| 6 | 0.011 | Very Faint Pint, barely detectable by eye |
| 7 | 0.009 | Colourless |

This experiment showed that:
(a) The adsorbent membrane can remove "pink tinge" which is a common white wine fault in one or two stages.
(b) The adsorbent could remove all the colour in a burgundy wine by a single pass through a column filled with adsorbent membrane of sufficient height so as to equal seven equilibration stages.
(c) In stacked sheets of 200 micron thickness only a 1.4 mm thickness would be needed on the basis of the above experiments.
(d) A greater bed thickness will be needed for a column packed with shredded membrane sheet or a fluffy form of adsorbent.
(e) Repeated regeneration is possible without any loss of adsorbent power. Also the regeneration is absolutely complete to allow total colour removal.

EXAMPLE 13

A single stage equilibration of two grams of the adsorbent membranes of EXAMPLES 2 and 3 with 20 g each of Orlando "Coolabah" Burgundy gave the following distribution coefficients:

| | |
|---|---|
| EXAMPLE 2 | Kd = 146 |
| EXAMPLE 3 | Kd = 107 |

The different burgundy of Example 10 gave Kd of 105 with the Example 2 adsorbent which is in good agreement with this example.

EXAMPLE 14

360 grams of 55 dtex 17 filament polyamide 6 zero twist fibre was added with stirring to disperse lumps over 15 minutes into 900 ml of 6.67 normal hydrochloric acid at 22 degrees Celsius.

After standing at 22 degrees Celsius for one hour to mature (maturing time) the viscous, milky liquid was poured into 360 grams of vigorously stirred Witco Chemical Corp swimming pool "Diatomite", which is composed of the skeleton remains of diatoms, to form a uniform powder with a tendency to clump.

The mix was then sifted into the vortex of twin high-speed intertwined mixers containing 10 liters of water. It formed a smooth suspension with all particles below 2 mm diameter and most particles about 0.1 mm diameter.

The slurry was washed by decantation with water five times and then neutralised to pH 7.0 with sodium carbonate. After further washing the slurry was filtered and dried in a fluid bed below 100 degrees Celsius and then crushed and sieved to below 1 mm diameter.

A similar powder was made after 24 hours maturing time at 22 degrees Celsius.

A further similar powder was made after 14 days maturing time at 22 degrees Celsius.

These three powders contained 21% of polyamide. The apparent or packing bulk densities were 0.188 wet and 0.22 dry. They were all suited to column adsorption procedures because of rapid adsorption and low pressure drops.

EXAMPLE 15

A standard rate of adsorption test was devised. A 0.5% w/v solution of B.P. tannic acid was preserved for one week under a 5 mm layer of hexane which dissolved no detectable quantity.

The ultraviolet (276 nanometer) optical density was not stable and fell at about 1% per day so that fresh solutions were needed each week for reasonable reproducibility.

An attempt to use phenolphthalein as a standard at pH 4 failed due to even greater instability.

Tannic acid was selected because of the practical importance, the possession of a range of molecular weights and the high distribution coefficient (Kd) of 212 in favour of polyamide 6 of the invention compared to water at pH 4. The powders of Example 14 could adsorb 34% by weight of tannic acid, calculated on the weight of organic materials present. The latter are estimated by ash content and consist of Nylon 6 hydrolytic decomposition products.

Adsorbent was weighed out so as to contain 0.2 grams of organic material, equivalent to 0.94 grams of Example 14 powders. The adsorbent was placed in a 30 ml flat bottom stoppered vial with a teflon-coated small bar magnet. 20 ml of the 0.5% B.P. tannic acid at pH 4.0 was added usually at 25 degrees Celsius. The stirrer is set to give the best mixing possible for the desired time. Most of the powder settled rapidly at over 10 cm/minute.

A 0.5 ml supernatant sample was sucked off into a pipette through a wrapped cotton wad filter-tip and diluted to 100 ml with N/10 hydrochloric acid to suppress ionization of the phenolic groups and to slow down oxidation. The concentration of residual tannic acid was then suitable at 10 to 40 parts per million for the determination of optical density (O.D.) in a one centimeter silica cell. A blank cell with no sample was used for comparison. The loss of tannic acid to the solid was calculated as grams of adsorbed tannic acid per 100 grams of organic matter (mainly "nylon 6"homologues).

Measurements were taken at convenient adsorption times of approximately two minutes (a minimum), 25 to 30 minutes, 50 to 60 minutes and overnight 12 to 20 hours.

The 24 hour maturation time powder of Example 14 showed the following rates of adsorption.

| Time | percentage w/w tannic acid on "Nylon 6" content |
|---|---|
| 2 minutes | 12.9 |
| 25 minutes | 19.8 |
| 25 minutes (a different day) | 25.3 |
| 50 minutes | 27.2 |
| 12 hours | 34.1 |
| 60 hours | 33.9 |

The results suggest that this powder required about 25 minutes contact time to allow substantial diffusion from exterior solution to the inside of particles. In a bed diffusion distances would be smaller but convection would be less. These opposing effects appear to balance out since preliminary column adsorption suggests 25 minutes contact time per stage is near optimal for column productivity, allowing for regeneration time and the costs of recycling weak liquors.

The three powders of Example 14 were compared at the indicative contact times of 25 minutes (to assess useful rate of uptake of tannic acid) and after 12 hours (to assess saturation uptake capacity).

| Maturation time before powder precipitation | % Tannic acid on "Nylon 6" content in 25 minutes | % Tannic acid "Nylon 6" content in 12 hours |
|---|---|---|
| 1 hour | 21.6 | 34.6 |
| 24 hours | 19.8 | 34.1 |
| 14 days | 12.4 | 31.6 |

The powders differed little except that the 14 day storage of hydrolysed Nylon 6 before precipitation (when the "dope" viscosity was markedly low) gave a powder of markedly lower kinetic uptake and perhaps a significant lower saturation equilibrium uptake.

That convective diffusion from the bulk liquid into the pores is the rate-limiting step was confirmed in two ways:

(a) The 24 hour maturated "dope" of Example 14 was used to make one square meter of 0.2 mm thick porous membrane weighing 55 grams with a swollen volume of 226 ml. The 0.5% tannic acid was forced through at 150 kPa at a rate equivalent to 250 l/sq.m./hr. for one minute. The uptake of tannic acid with the one minute contact time was 13.75 grams equivalent to 25% w/w uptake on the membrane weight.

(b) The same membrane was subjected to the above standard uptake test when cut into 5 mm squares. Uptake in 40 minutes was only 17.4% although the saturation level in 60 hours reached 36.2% w/w. The membrane form was slightly superior to the fine powders in equilibrium uptake of tannic acid. It is also advantageous in rate of uptake, if solution can be pumped through it but crushes easily so that multiple thicknesses cannot be used. It is also advantageous in that it has a lower void volume than the powders. This gives less "displacement mixing" with wash waters before and after regeneration.

However, the slower uptake and the greater cost are disadvantages in any column form of use. There is an optimum column adsorbent close to the powders of Example 14 but attempts to get even greater rates of uptake and better drainage (if necessary by squeezing or air blowing) appeared justified as methods of optimization of costs.

It should also be noted that two attempts to recover tannic acid by washing with N/10 sodium hydroxide resulted in brown oxidation products since oxygen was not excluded. Recoveries were 75 and 85%. In cases of easy oxidation some dark colour was always left on the membrane Although adsorption seemed unaffected by the dark residues no kinetic equilibrium study was done.

Exclusion of oxygen may be needed to protect the system. Nitrogen is often used for apple juice. A stable phenol such as dibromothymolsulphophthalein was soaked out completely on alkaline regeneration, leaving a white residue, recovery was complete.

EXAMPLE 16

Sulphuric acid was used instead of the hydrochloric acid of Example 2 as a solvent for polyamide 6 in making the dope to avoid problems associated with processing using hydrochloric acid.

Nine dopes, with differing proportions of Nylon 6 and acid were made, using all combinations of 35.5, 37.5 and 39.5 g nylon/100 ml acid and 40%, 42% and 44% w/w concentration of the $H_2SO_4$.

Polyamide 6 was added to $H_2SO_4$ (at 22° C.) over a period of 20 minutes with continual mixing using a planetary mixer.

The mixture of the polyamide and sulphuric acid was then left to mature for 2 hrs. (at 22° C.) in a vacuum sealed desiccator to remove bubbles.

EXAMPLE 16(a)

A portion of the "dope" after maturing time was reserved for making membrane films. The matured dispersion and solvent was spread onto a glass plate with film thickness of about 130 microns. The coated plate was placed in a water bath for three minutes, to ensure complete precipitation. It was then soaked in a basic solution for one hour, then placed into water and soaked for one hour.

The films were then tested by passing 50 ml of 0.05% w/w tannic acid through each of the nine membranes using a 50 ml stirred cell at 100 kpa pressure. The initial optical density of the tannic acid was recorded at 276 nm. The dry weight of tested membrane section was also recorded The tannic acid adsorbed was measured by the difference in optical density

| PERCENT BY WEIGHT UPTAKE OF TANNIC ACID/WEIGHT OF DRY MEMBRANE | | | |
|---|---|---|---|
| Grams of nylon | Weight Concentration % w/w of $H_2SO_4$ | | |
| per 100 ml Acid | 40% | 42% | 44% |
| 39.5 | 28% | 32% | 21% |
| 37.5 | 28% | 35% | 20% |
| 35.5 | 25% | 28% | 19% |

The membrane made with 37.5 gm of Nylon 6 per 100 ml of 42% w/w $H_2SO_4$ showed the highest adsorption of tannic acid per unit weight of membrane.

EXAMPLE 16(b)

The "dope" mixture was poured as a thin stream into a high speed blender containing basic solution. The membrane coagulated to form small spongy fibres up to 5 mm in length and 1 mm in width. The chopped membrane was soaked in basic solution, to ensure neutralization, then filtered and water washed five times.

A solution of 0.01% w/v Bromothymol blue, buffered to pH 4, was used to test the nine types of chopped membrane. The optical density at 436 nm was taken each day to establish its stability. Over one week no appreciable change occurred in optical density 0.05 grams of the chopped membrane was stirred with 15 mls of 0.01% w/v bromothymol blue solution for 1½ hours. The chopped membrane was then filtered off and the resulting optical density was measured. The bromothymol blue solution was diluted by a factor of 10 for measurement of the optical density. The initial optical density at 436 nm was 0.290 and the final optical density for each sample is shown in the following table:

| Grams of nylon | Concentration % w/w $H_2SO_4$ | | |
|---|---|---|---|
| per 100 ml Acid | 40% | 42% | 44% |
| 39.5 | .04 | 0.038 | 0.043 |
| 37.5 | .04 | 0.03 | 0.043 |
| 35.5 | .045 | 0.040 | 0.05 |

The chopped membrane made from the dope containing 7.5 gm/100 ml 42% w/w acid showed highest adsorption of the bromo thymol blue solution. From the change in optical density, the calculated % adsorption is 2.6% (weight of bromothymol blue adsorbed per weight of chopped membrane).

EXAMPLE 17

Dope was made using 37.5 gm of polyamide 6 per 100 ml of 42% w/w $H_2SO_4$ as described in example 16. However, the mixing temperature and maturing temperature was raised to 40° C. The membrane was tested with the higher maturing temperature as sulphuric acid is conveniently cooled to this temperature after make-up. The 42% w/w acid was made by dilution of 98% w/w $H_2SO_4$, giving upon mixing, a temperature rise to 1000° C. Cooling to only, provided a quicker processing time than cooling to 25° C.

No appreciable difference was found. A test was performed as in 16(a). The tannic acid adsorption was between 33% and 35% per weight of membrane. Optimized dope was 37.5 gm nylon/100 ml 42% w/w $H_2SO_4$ matured at 40° C.

EXAMPLE 18

Whitco Chemical Corporation swimming pool diatomaceous earth, ("Diatomite") was added to optimized dope of example 17 so that upon coagulation in a high speed blender a powder was formed rather than chopped fibres.

Increasing amounts of diatomite was added until fibres were no longer formed upon coagulation as shown in the following table:

| Weight % Diatomite/ Weight of dope | Observations |
|---|---|
| 5% | fibres still formed |
| 10% | fibres still formed |
| 15% | fibres still formed |
| 21% | dope formed a paste, upon coagulation a powder was formed in blender. |

The Powder formed in the blender was water washed several times to remove salts obtained during neutralization. The powder was sieved through a 1 mm mesh sieve and its composition was found to be 46.0% polyamide 6 and 54.0% Diatomaceous earth.

0.05 grams of powder was mixed with 15 ml of tannic acid for 4 hrs and it was found that 0.021 gms tannic acid was adsorbed by the powder. This corresponds to uptake per weight of dry powder, or 91% of the Nylon 6.

15 ml of 0.01% Bromo thymol blue solution was mixed with 0.05 gms of powder. 1.8% adsorption per unit weight of powder was observed. This is equivalent to 3.9 gms per 100 gms of nylon membrane without diatomite.

EXAMPLE 19

0.07 gms of Adsorption powder was equilibrated with 20 mls of 0.01% w/v bromothymol blue at pH4. The bromo thymol blue solution was then filtered off, and reserved to be mixed with regenerating ammonia. 150 ml of ammonia was added to the powder over 1 hr and 45 min when the powder appeared to be regenerated.

The ammonia was boiled off leaving 20 mls bromothymol blue solution at pH 4. The optical density (436nm) of this solution was 0.278 compared with the initial optical density of 0.290.

Ammonia proved to be a successful means of regeneration. Because of its lower pH than caustic solution (0.1 mol/liter) regeneration was much slower. However ammonia can be boiled off for easy separation, this being the major advantage in its use.

EXAMPLE 20

A burette of volume 325 ml was packed using a slurry of the adsorbent. Its wet packing density was 132.5 gm/liter and voidage was 87%.

Two liters of 1% w/w solution of tannic acid was fed through at 9 ml/min. (This rate ensured that equilibrium was reached). The ratio of measured concentration, C, to initial concentration, Co, against volume is given in the following table:

| VOLUME (ml) | C/Co % |
|---|---|
| 750 | 22 |
| 825 | 30 |
| 860 | 37.5 |
| 890 | 44 |
| 910 | 50 |
| 935 | 57 |
| 950 | 64.5 |
| 975 | 77 |
| 1000 | 85 |
| 1050 | 92 |
| 1150 | 96 |

EXAMPLE 21

A 6×21 sample of Sanitarium Brand Apple juice (ex Bulmer Co.) was stored at 4° C. Its optical density was 0.238 at 420 nm A 58 cm×2.5 cm diameter column was packed with 56 cm of the first adsorbent prepared in Example 14 and washed with tap water. The Apple juice was then fed through the column. The O.D. of the eluate at 420 nm was 0.025. Two subsequent official, trained, taste panels could detect no change in flavour, and there was no detectable change in analysis for total phenolics, total amino acids, ash, potassium, protein, L-malic acid, sucrose, glucose, fructose and alcohol. Thus an important property of the invention is that there is no removal of flavour, nor of any food component, other than the colourant polyphenols.

I claim:

1. A method of removing a polyphenolic substance from a solution, comprising the steps of:
   (a) preparing a polyamide adsorber by
      (i) dissolving a drawn polyamide in an acid solution, wherein the w/w range of acid to polyamide is from 1.32:1.00 to 2.80:1.00 for a sufficient time and temperature to produce an acidic, partly hydrolyzed colloidal solution thereof,
      (ii) allowing said solutions to mature for at least one hour,
      (iii) precipitating the colloidal solution of polyamide to form said polyamide adsorber, and
   (b) adsorbing said polyphenolic substance from said solution onto said polyamide adsorber.

2. The method of claim 1, wherein the polyamide is an aliphatic polyamide of substantially high crystallinity.

3. The method of claim 1, wherein the polyamide is nylon 6 or nylon 6,6.

4. The method of claim 1, wherein the polyamide has controlled porosity and an extended surface.

5. The method of claim 1, wherein the surface of said polyamide adsorber is modified by treatment with glutaraldehyde/resorcinol or by glutaraldehyde with melamine, 1,6-hexamethylenediamine or mixed amino acids.

6. The method of claim 1, wherein the adsorption step is followed by a washing step and the polyphenolic substance is recovered by effecting a pH change during elution to regenerate the polyamide adsorber.

7. The method of claim 1, wherein the solution contains a plurality of polyphenolic substances.

8. The method of claim 1, wherein the polyamide adsorber is in the from of a sheet.

9. The method of claim 1, wherein the polyamide adsorber is in the form of fine particles.

10. The method of claim 1, wherein the polyamide adsorber is in the form of beads.

11. The method of claim 1, wherein the polyamide adsorber is in the form of threads.

12. The method of claim 1, wherein the polyamide adsorber is modified by the addition of an unreactive solid during the preparation of the adsorber.

13. The method of claim 12, wherein the unreactive solid is diatomaceous earth.

14. The method of claim 1, wherein the polyamide adsorber is prepared from a dope formed by dissolving a polyamide in an acidic solvent that is cast at a thickness of from 100 to 300 microns and then immersed in a alkali hydrogen carbonate solution to give a sheet having some coarse holes of 0.05 to 1 mm diameter with the major portion of the adsorber containing ultrafiltering sizes of interconnected pores.

15. The method of claim 1, wherein said adsorbing step is followed by carbon treatment of the residual solution.

16. The method of claim 1, wherein the acid is hydrochloric acid or sulfuric acid.

17. The method of claim 1, wherein the source of polyphenols is an anthocyanin contained in fruit or vegetable juice or beverage.

18. The method of claim 1, wherein the source of polyphenols is a tannin-containing solution.

19. The method of claim 6, wherein a volatile alkali or acid is used to effect the pH change.

20. The method of claim 6, wherein a non-volatile alkali is used to effect the pH change followed by the simultaneous recovery of the polyphenol and the alkali by electrochemical means.

21. The method of claim 7, wherein said adsorbing step comprises removing all of the polyphenolic substances from the solution without removal of other components of the solution.

22. The method of claim 7, wherein said adsorbing step comprises removing at least one polyphenolic substance from the solution without removing other polyphenolic substances.

23. The method of claim 7, wherein said adsorbing step comprises separating the individual members of the plurality of polyphenolic substances from one another.

24. A method of removing a polyphenolic substance and a hydroxymethyl-furfural derived color from a solution containing the same, comprising the steps of:
  (a) preparing a polyamide adsorber by
    (i) dissolving a drawn polyamide in an acid solution is from 1.32:1.00 to 2.80:1.00 for a sufficient time and temperature to produce an acidic, partly hydrolyzed colloidal solution thereof,
    (ii) allowing said solutions to mature for at least one hour,
    (iii) precipitating the colloidal solution of polyamide to form said polyamide adsorber, and
  (b) adsorbing the polyphenolic substance onto said polyamide adsorber; and
  (c) removing the hydroxymethyl-furfural derived color by contacting said solution with activated carbon.

* * * * *